March 9, 1954     G. H. STEWART, JR     2,671,877
TWO-PHASE MOTOR CONTROL
Filed Oct. 20, 1952
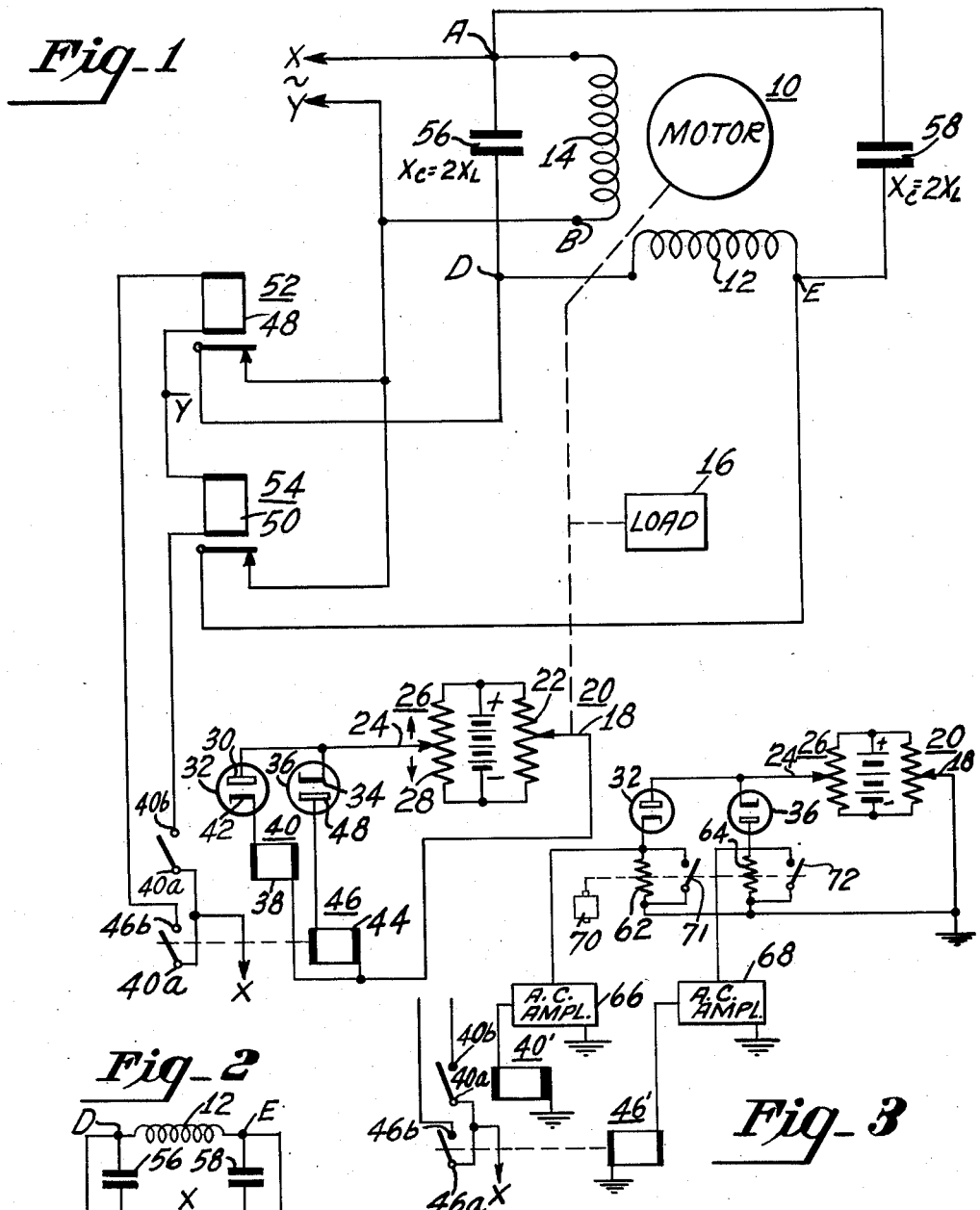
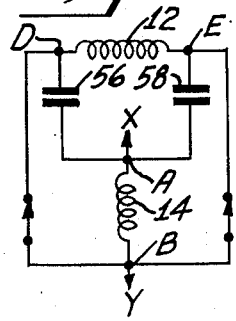
INVENTOR.
*Gilbert H. Stewart, Jr.*
BY *Milton S. Winton*
ATTORNEY Patented Mar. 9, 1954

2,671,877

UNITED STATES PATENT OFFICE 2,671,877

TWO-PHASE MOTOR CONTROL

Gilbert Henry Stewart, Jr., Haddonfield, N. J., assignor to Radio Corporation of America, a corporation of Delaware Application October 20, 1952, Serial No. 315,803

15 Claims. (Cl. 318—29)

The present invention is related to motor control circuits, and particularly to a motor control circuit for a two-phase motor.

Two-phase motor control circuits are known having a switch control to cause the motor to turn in either direction of rotation at the election of the operator. Usually, when the motor is to be stopped, the operator merely interrupts the application of power. Thereupon the motor and its load coast to a stop. Damping means are known for causing the motor to stop more quickly. However, these means are more or less complicated, and may require additional windings. Sometimes mechanical instead of electrical means are employed for damping. Quick stopping of the motor and load is of especial importance in servo systems. The present invention may be employed to special advantage in an extremely simple type of positioning servo system, of the "on-off" type and employing a two-phase motor.

It is an object of the present invention to provide a simple, novel control circuit for a two-phase motor.

It is another object of the invention to improve the control of two-phase motors, and particularly to induce the quick stopping of such a motor when driving power is removed.

A further object is to provide a novel dynamic damping means for a motor of the two-phase type.

A further object of the invention is to provide a motor control circuit especially useful with and adapted for operation with a simple type of "on-off" servo mechanism.

These and other objects, advantages, and novel features of the invention will be more apparent from the following description when taken in connection with the accompanying drawing, in which like reference characters refer to similar parts and in which:

Fig. 1 is a circuit diagram schematically illustrating one embodiment of the invention as applied to a positioning servo mechanism;

Fig. 2 is a circuit diagram schematically illustrating a simplified control circuit according to the invention which might be employed for manual motor control; and Fig. 3 is a modification of a portion of Fig. 1.

According to the invention, one winding of a two-phase motor is paralleled with a pair of serially-connected capacitors. A series-connected pair of normally closed contacts or switches also parallel the one motor winding. The other winding of the motor is connected between the junctions between the capacitors and between the contact means. The source terminals are also connected between these junctions. Therefore, as will appear more fully hereinafter, when one contact is opened, the power applied to the windings is suitably phased by the capacitors to drive the motor in one direction. When the other contact is opened, the power applied to the windings is suitably phased to drive the motor in the reverse direction. When both contacts are closed, the one winding is short-circuited. The short circuit provides dynamic braking and tends to quickly halt the motor. The capacitor values are selected to minimize current drain in non-drive periods by affording parallel resonance in these periods across the other coil in circuit with the source.

An important feature of the invention is selection of the capacitors to be equal valued and to have a reactance twice that of either winding alone, the winding reactances being equal.

Further, according to the invention, there is provided means to derive a voltage having a sense dependent on the sense of the lack of positional correspondence between the position of a position determining element, and the position of a motor driven element or the load. Further means are provided for opening one contact or the other, depending on this sense voltage, and opening neither if there is substantial positional correspondence and zero sense voltage. It is found that because of the restriction on further motor movement imposed by the short-circuit of the one winding, when positional correspondence is reached, that a position servo according to the invention having excellent accuracy may be constructed using only very simple component parts.

This servo will perform as well, for many purposes, and especially in simple cases, as a more complex and expensive arrangement using proportional control and even rate correction. The qualities of this servo will be found better than similar "on-off" types which do not have the disadvantage of the short-circuited winding when the motor is to be stopped.

Referring to Fig. 1, a two-phase motor 10 has windings 12 and 14. Motor 10 drives a load 16 through a suitable mechanical connection to its shaft and also the arm 18 of a potentiometer 20 having a resistor 22 contacted by the arm. The load is to be positioned in correspondence with the position of an element, say the arm 24 of a potentiometer 26 having a resistor 28. The arm 24 may be manually positionable as desired. The arm 24 of the control potentiometer is connected to an anode 30 of one rectifying element or diode 32 and also to a cathode 34 of another rectifying element or diode 36 of a pair of diodes 32, 36. The driven arm 18 of potentiometer 20 is connected through the winding 38 of one relay 40 of a pair of D. C. (direct current) relays to the cathode 42 of the one diode 32. The driven arm 18 is also connected through a winding 44 of the other relay 46 of the pair of D. C. relays to the anode 48 of the other diode 36. The two terminals of an A. C. (alternating current) power source are indicated as X, Y. The terminal X is connected to one of the terminals 40a and 46a of each of the normally open contacts or switches of relays 40 and 46 respectively. Each of the other terminals 40b and 46b of the contacts is returned to the other terminal Y of the A. C. supply respectively through the windings 48 and 50 of each of A. C. relays 52 and 54 respectively. The normally closed contacts of A. C. relays 52 and 54 are serially connected together and the series is connected in parallel with the one motor winding 12 by connection between terminals D and E. A pair of capacitors 56 and 58 are serially connected together, and the capacitors are connected in parallel with the one motor winding 12 by connection between terminals D and E. The reactance of each capacitor, at the frequency of the A. C. source from terminals X, Y, to be applied to drive the motor, is selected to be twice the inductive reactance of each winding. The windings are assumed to have substantially equal inductive reactance at this frequency. The junction between capacitors 56 and 58 is connected to one terminal A of the other winding 14 and also to the X terminal of the A. C. source. The other terminal B of the other winding 14 is connected to the junction between the contacts of the A. C. relays 50 and 52, and also to the Y terminal of the A. C. source.

In operation, assume the potentiometer arms 24 and 18 initially to be in positional correspondence, and each connected to the same potential point with respect to the other on its potentiometer resistor. Thus the control element (arm 24) and the load are also in positional correspondence. Let the control element be moved in one direction, to be specific, say toward the more positive D. C. source terminal. There now exists a potential difference between the potentiometer arms causing diode 32 to conduct. The D. C. relay 40 is therefore actuated to close its contact. Thus A. C. voltage is applied to relay 50 causing its normally closed contact to open. The short circuit of winding 12 is thereby opened. Voltage is now applied across the terminals D and E of winding 12 because terminal E thereof is connected to terminal X of the A. C. source through capacitor 58 and terminal D of the one winding 12 is connected to terminal Y of the A. C. source through the normally closed contact of the non-activated A. C. relay 52. The other winding 14 of the motor 10 also has voltage applied across it, because terminal B thereof is connected to terminal Y of the A. C. source and terminal A of winding 14 is connected to terminal X of the A. C. source. Because of the selected values of the capacitors, and assuming the inductance and resistance of one winding (including the resistance component attributable to the load) to be equal respectively to those of the other winding, the current through the two windings are in 90° phase relationship, with the current in one winding, say the one 12, leading that in the other. In fact, simple analysis whether by vector diagram or otherwise, shows that this circuit arrangement affords excellent power factor and proper phasing of the two motor windings, with a wide variety of load conditions. In any event, whether this analysis be correct or not, the motor drives in one direction which is selected, of course, to drive the load 16 and the arm 18 toward positional correspondence with the control arm 24. The arm 18 is driven toward the more positive connection of resistor 22 to the D. C. source.

When the position of correspondence is reached, or slightly before, depending on the D. C. relay sensitivity, the D. C. relay 40 and A. C. relay 50 are de-activated. The one winding 12 is short-circuited. Therefore, a current depending on the motor speed and opposing the motor drive motion flows in this winding. This opposition current tends to halt the motor abruptly, and with very little coasting, if any. Dynamic braking is thus provided. At the same time, as the connection of the terminal D to E of the one winding 12 is re-established, the two capacitors are again in parallel across the winding 14. With the selected values of the capacitors, a parallel resonance is thus presented to the flow of line current from the A. C. source through winding 14. The motor therefore draws negligible current, and may remain connected across the line in the manner diagrammed, such a small current flowing that the motor winding 14 is not adversely affected. In fact, this line current flowing in this condition of equilibrium may be considered negligible.

The operation in the event that the control element is moved toward the more negative D. C. source terminal, causing diode 36 to conduct to actuate relay 46 is readily understood from what has been said above. The sequence of operation in this event is that, with actuation of relay 46, actuation of relay 52 follows. The role of the capacitors is reversed. Capacitor 56 is now in series with the one motor winding 12 and capacitor 58 is now in parallel with the other motor winding 14. As readily verified, the phase relationship of current flow in the motor windings is also reversed, the one formerly leading now lagging.

It will be recognized that the circuit shown is illustrative. For example, if the contacts of D. C. relays 40 and 46 could handle the power requirements of the motor connected relays with the requisite sensitivity, it is apparent that the intervening relay circuit could be omitted. In other words, one may suppose relays 40 and 46 respectively to actuate the contacts of relay 54 and 52 respectively, and the intervening circuitry omitted. In fact, this arrangement could operate as a simple positioning device, by omitting all the relays and potentiometers, but retaining the contacts of the A. C. relays as a manually operated switch or switches. The operator then opens one or the other switch to drive the motor in a desired direction a desired amount and closes the switch to cause an abrupt halt of the motor. Fig. 2 is a simplified circuit diagram schematically illustrating such a manual control circuit. Only one of the switches is to be opened at a time, of course.

If, instead of D. C. relays 40, 46, respectively, it is desired to use A. C. relays, the circuit of Fig. 1 may be modified as shown in Fig. 3. Here resistors 62 and 64 serve as load resistors respectively for diodes 32 and 36, and are serially connected respectively thereto in the place of the windings of relays 40 and 46 respectively. Each serially connected diode and resistor is connected in opposite sense between the potentiometer arms 18 and 24. The driven arm 18 may be returned to a common ground connection conventionally shown. A pair of A. C. amplifiers 66 and 68 respectively are connected across the diode resistors 62 and 64 respectively to receive A. C. voltage developed across these resistors. This A. C. voltage results from the actuation of a pair of switches 71 and 72 respectively also connected across resistors 62 and 64. The switches are driven at the same frequency, as by an A. C. relay (not shown) or by a motor 70 mechanically connected (as by a cam or the like) as schematically indicated, to open and close the switches at predetermined preferably equal time intervals. A pair of A. C. relays 40' and 46' are connected respectively at the outputs of the respective A. C. amplifiers 66 and 68. These relays 40' and 46' have contacts like those of the D. C. relays 40 and 46 respectively of Fig. 1 and connected in like manner to the remainder of the circuit.

In operation, if one diode or the other (32 or 36) of Fig. 3 conducts, the switches act as "choppers" causing rectangular voltage pulses to appear at the input of the A. C. amplifier 62 or 64 connected across the resistor through which the current is drawn when the switch is open. The A. C. voltage (the rectangular pulses) is then amplified in one of the A. C. amplifiers to actuate the particular A. C. relay 40' or connected across the resistor through which current is drawn. This particular A. C. relay thus actuated then closes one of the contacts 40b or 46b, connected in circuit as in Fig. 1, to cause the motor to drive the driven arm 18 into a position of correspondence with the control arm 24. The reason for using the A. C. amplifiers and the relays actuated by their respective outputs is that sometimes a greater sensitivity may thus be secured. At other times, the relays alone are sufficiently sensitive without the use of the amplifiers.

However, the circuit of Fig. 1 as shown was built and operated successfully. Tubes 32 and 36 were the two halves of a 6AL5. Relays 40 and 46 were sigma type 5RS26 sensitive relays. Relays 52 and 54 were A. C. relays of an ordinary type suitable for connection across a 110 volt line voltage. The motor was a 5 watt two-phase motor of standard make, operated with a 60 cycle power supply of 117 volts. Capacitors were 2 microfarads. The load was the equivalent of 2 inch-ounces.

The invention has thus been described as an exceptionally simple and desirable motor control circuit for a two-phase motor, providing quick stopping, good power factor, and especially well adapted for a servo system of the "on-off" type.

What is claimed is:

1. A motor control circuit for a two-phase motor having a pair of windings to which power is to be applied from an A. C. source at a definite operating frequency, and comprising a pair of serially connected equal value capacitors connected in parallel with one of said windings, a pair of serially connected normally closed switches connected in parallel with said one winding, the other said winding being connected between the junctions between said cpacitors and between said switches, and means to apply to said source between said junctions, the capacity of each of said capacitors being selected to afford for each capacitor a reactance at the operating frequency equal to twice that of the said other motor winding.

2. A motor control circuit for a two-phase motor having a pair of windings to which power is to be applied from an A. C. source at a definite operating frequency, and comprising a pair of serially connected equal value capacitors connected in parallel with one of said windings, a pair of serially connected normally closed switches connected in parallel with said one winding, means selectively to open one or the other of said switches, the other said winding being connected between the junctions between said capacitors and between said switches, and means to apply voltage from said source between said junctions, the capacity of each of said capacitors being selected to afford for each capacitor a reactance at the operating frequency equal to twice that of the said other motor winding.

3. The circuit claimed in claim 2, each of said switch opening means comprising a different one of a pair of relays.

4. The circuit claimed in claim 1, each of said switches being a manual switch.

5. The circuit claimed in claim 2, said switch opening means comprising a pair of relays each having a normally closed contact, each of said switches being a different one of said contacts.

6. A motor control circuit for a two-phase motor having a pair of windings of substantially equal inductance to which power is to be applied from an A. C. source at a definite operating frequency, and comprising a pair of serially connected equal value capacitors connected in parallel with one of said windings, a pair of serially connected normally closed switches connected in parallel with said one winding, means to selectively open one or the other of said switches, the other said winding being connected between the junctions of said capacitors and said switches, and means to apply power from said source between said junctions, the reactance of each said capacitor being twice the reactance of a single one of said windings at said operating frequency.

7. The circuit claimed in claim 6, said switch being manual.

8. The circuit claimed in claim 6, each of said switch means comprising a different one of a pair of relays, said switches each comprising a contact of a different relay.

9. A servo system comprising a first control element, a second element to be driven into positional correspondence with said first element, means to derive a voltage having a sense responsive to the sense of the lack of positional correspondence of said elements, a pair of normally closed serially connected switches, means selectively actuated in response to said voltage sense to selectively open one or the other of said switches, a two-phase motor mechanically connected to drive said second element and having a pair of windings to which power is to be applied from an A. C. source at a definite operating frequency, a pair of serially connected equal value capacitors connected in parallel with one of said windings, said serially connected switch means also being connected in parallel with said one winding, the other said winding being connected between the junction between said capacitors and the junction between said switch means, and means to apply voltage from said source between said junctions, each said capacitor having a reactance at the operating frequency twice that of said other winding, whereby on actuation of one of said switch means in response to lack of positional correspondence of said elements, said second element may be driven by said motor toward positional correspondence with said control element, and on nonactuation of said switch means, said one winding is short-circuited to afford dynamic braking of said motor.

10. The system claimed in claim 9, said switch actuating means each comprising a different one of a pair of relays.

11. The system claimed in claim 9, said means for deriving a sense voltage comprising a pair of potentiometers each having an arm and a resistor, said resistors being connected in parallel, means to connect said resistors between a D. C. voltage source, said position control element including one of said arms and said driven element including the other of said arms, the voltage difference between said arms being said sense voltage.

12. The system claimed in claim 11, said switch actuating means comprising a pair of rectifying elements, each having an anode and a cathode, a pair of D. C. relays each having a winding, one rectifying element having its anode connected to said position control element and its cathode through one of said relay windings to said driven element, the other said rectifying element having its cathode connected to said position control element and its anode through the other said relay winding to said driven element, whereby one relay or the other is actuated in response to said sense voltage.

13. The system claimed in claim 12, said switch actuating means further comprising a second pair of relays each having a winding and a contact, said last-named contacts serving as said serially connected switches and being normally closed, said D. C. relays each having a normally open contact, each said normally open contact being connected to apply a service of actuating power to a different one of said second relays on actuation of a different one of said D. C. relays.

14. A motor control circuit for a two-phase motor having a pair of windings to which power is to be applied from an A. C. source at a definite operating frequency, and comprising a pair of serially connected capacitors connected in parallel with one of said windings, a pair of serially connected normally closed switches connected in parallel with said one winding, the other said winding being connected between the junctions between said capacitor and between said switches, and means to apply voltage from said source between said junctions, the capacity of said capacitors being selected to afford parallel resonance between them and said other winding with both said switches in their normally closed condition.

15. The system claimed in claim 9, said means for deriving a sense voltage comprising a pair of potentiometers each having an arm and a resistor, said resistors being connected in parallel, means to connect said resistors between a D. C. voltage source, said position control element including one of said arms and said driven element including the other of said arms, the voltage difference between said arms being said sense voltage; said switch actuating means comprising: a pair of rectifying elements, each having an anode and a cathode, a pair of load resistors, each load resistor being connected serially to a different one of said rectifying elements and each serially connected load resistor and rectifying element being connected in a different sense between said arms, a pair of chopper contacts, each connected respectively across a different one of said load resistors, a pair of A. C. amplifiers each connected respectively across a different one of said load resistors, and a pair of A. C. relays each connected respectively to a different one of said amplifiers and each actuated separately by the output from a different one of said amplifiers.

GILBERT HENRY STEWART, Jr.

References Cited in the file of this patent

UNITED STATES PATENTS

| Number | Name | Date |
|---|---|---|
| 2,454,968 | Fuge | Nov. 30, 1948 |
| 2,471,075 | Montrose-Oster | May 24, 1949 |

OTHER REFERENCES

Trade publications, "The Solar System," Solar Mfg. Co., New York, N. Y., vol. 4, No. 1, June 1946, pp. 14–15.